United States Patent
Morita et al.

(10) Patent No.: US 8,554,262 B2
(45) Date of Patent: Oct. 8, 2013

(54) RADIO STATION APPARATUS, RADIO RESOURCE CONTROL METHOD, RECORDING MEDIUM STORING RADIO STATION CONTROL PROGRAM, AND RADIO COMMUNICATION SYSTEM

(75) Inventors: Motoki Morita, Tokyo (JP); Kojiro Hamabe, Tokyo (JP)

(73) Assignee: NEC Corporation, Tokyo (JP)

( * ) Notice: Subject to any disclaimer, the term of this patent is extended or adjusted under 35 U.S.C. 154(b) by 400 days.

(21) Appl. No.: 12/920,269

(22) PCT Filed: Feb. 12, 2009

(86) PCT No.: PCT/JP2009/052342
§ 371 (c)(1),
(2), (4) Date: Aug. 30, 2010

(87) PCT Pub. No.: WO2009/122778
PCT Pub. Date: Oct. 8, 2009

(65) Prior Publication Data
US 2011/0003559 A1  Jan. 6, 2011

(30) Foreign Application Priority Data

Mar. 31, 2008 (JP) ................................. 2008-092205

(51) Int. Cl.
*H04B 7/00* (2006.01)
(52) U.S. Cl.
USPC ....................................... 455/522; 455/67.14
(58) Field of Classification Search
USPC .............................................. 455/67.14, 522
See application file for complete search history.

(56) References Cited

U.S. PATENT DOCUMENTS

| | | | |
|---|---|---|---|
| 6,771,978 B1 * | 8/2004 | Kayama et al. | 455/522 |
| 7,016,686 B2 * | 3/2006 | Spaling et al. | 455/453 |
| 8,160,631 B2 * | 4/2012 | Raghothaman et al. | 455/522 |

(Continued)

FOREIGN PATENT DOCUMENTS

| | | |
|---|---|---|
| CN | 1404321 A | 3/2003 |
| GB | 2 428 937 A | 2/2007 |

(Continued)

OTHER PUBLICATIONS

Office Action Dated Dec. 3, 2012, Issued by the State Intellectual Property Office of P.R. China in counterpart Chinese Application No. 200980107208.0.

(Continued)

*Primary Examiner* — Fayyaz Alam
*Assistant Examiner* — David Bilodeau
(74) *Attorney, Agent, or Firm* — Sughrue Mion, PLLC (57) ABSTRACT

To suppress, when communication is performed between two radio stations, interference on other radio stations located in the vicinity of them. A femto base station 1 communicates with a femto mobile station 3-1. The femto base station 1 includes a radio transmission/reception unit 11 and a radio resource control unit 15. The radio transmission/reception unit 11 measures reception quality of an uplink signal that is transmitted from a macro mobile station 3-2, which connects to and communicates with a macro base station 4, to the macro base station 4. The radio resource control unit 15 calculates an estimated loss value $L_E$ relating to a propagation loss $L_P$ between the macro mobile station 3-2 and the femto base station 1 by using a measured value of reception quality by the radio transmission/reception unit 11. Further, the radio resource control unit 15 determines a radio parameter relating to radio communication between the femto base station 1 and the femto mobile station 3-1 based on the estimated loss value $L_E$.

33 Claims, 8 Drawing Sheets

(56) References Cited

U.S. PATENT DOCUMENTS

| | | | |
|---|---|---|---|
| 2004/0127259 A1* | 7/2004 | Matsunaga | 455/560 |
| 2007/0021151 A1* | 1/2007 | Mori et al. | 455/562.1 |
| 2008/0102794 A1* | 5/2008 | Keevill et al. | 455/411 |
| 2009/0042596 A1* | 2/2009 | Yavuz et al. | 455/522 |
| 2009/0318182 A1* | 12/2009 | Nagato et al. | 455/522 |
| 2010/0167778 A1* | 7/2010 | Raghothaman et al. | 455/522 |
| 2010/0238905 A1* | 9/2010 | Hamabe et al. | 370/335 |
| 2011/0003557 A1* | 1/2011 | Morita et al. | 455/67.11 |
| 2011/0009147 A1* | 1/2011 | Morita et al. | 455/509 |
| 2011/0021240 A1* | 1/2011 | Hiltunen et al. | 455/522 |

FOREIGN PATENT DOCUMENTS

| | | | |
|---|---|---|---|
| JP | 2000-023238 | A | 1/2000 |
| JP | 2004-207840 | A | 7/2004 |
| JP | 2006-033601 | A | 2/2006 |
| JP | 2006-246334 | A | 9/2006 |
| JP | 2007-036487 | A | 2/2007 |
| JP | 2007151056 | A | 6/2007 |
| JP | 2007-258844 | A | 10/2007 |
| JP | 2007282141 | A | 10/2007 |
| JP | 200860994 | A | 3/2008 |
| WO | 00/55976 | A3 | 9/2000 |
| WO | 2006134946 | A1 | 12/2006 |

OTHER PUBLICATIONS

Communication issued May 28, 2013; by Japan Patent Office; corresponding application No. 2010-505432.

* cited by examiner

(a) $L_E = L_P = L_A + L_B \fallingdotseq (Pul\_tx - RTWP + L_A + Nul) / 2$ (b) $L_E = L_B \fallingdotseq (Pul\_tx - RTWP - L_A + Nul) / 2$ (c) $L_E = L_A + 2L_B \fallingdotseq Pul\_tx - RTWP + Nul$ (d) $L_E = \Delta L_B = \{(L_A + 2L_B) - AVE(L_A + 2L_B)\} / 2$

(a2)  $L_E = L_P = L_A + L_B \fallingdotseq Pul\_tx - RTWP + Nul$ (b2)  $L_E = L_B \fallingdotseq Pul\_tx - RTWP - L_A + Nul$ (d2)  $L_E = \Delta L_B = \{(L_A + L_B) - AVE(L_A + L_B)\}$

Fig. 9

PRIOR ART

RADIO STATION APPARATUS, RADIO RESOURCE CONTROL METHOD, RECORDING MEDIUM STORING RADIO STATION CONTROL PROGRAM, AND RADIO COMMUNICATION SYSTEM

TECHNICAL FIELD

The present invention relates to a radio resource control technique used in communication between radio stations.

BACKGROUND ART

In recent years, as the demand for indoor voice communication and data communication has grown due to the spread of mobile phones, the development of a home-use base station that can be installed inside a building such as a user's house and a small-scale office has been pursued. Since an area covered by the base station that can be installed indoors is considerably smaller than that of an existing base station installed outdoor, the area is called "femtocell". Hereinafter, a base station forming a femtocell is called "femto base station".

Femto base stations as well as base stations in existing mobile communication networks transmit a common pilot signal. A mobile station performs synchronization establishment, channel estimation, and the like by receiving a common pilot signal, and thereby performs data transmission/reception with a base station. Therefore, it is necessary to be able to receive a common pilot signal with good receiving quality in a mobile station in order to provide good communication quality.

In base stations in existing mobile communication networks, the transmission power of a common pilot signal to be transmitted in each cell is set to a fixed value. In contrast to this, as for common pilot signals transmitted by femto base stations in femtocells, a way of autonomously setting the transmission power by a femto base station has been studied. For example, Patent document 1 (page 14, line 8 to page 15, line 21) discloses such a method.

Figure 10:
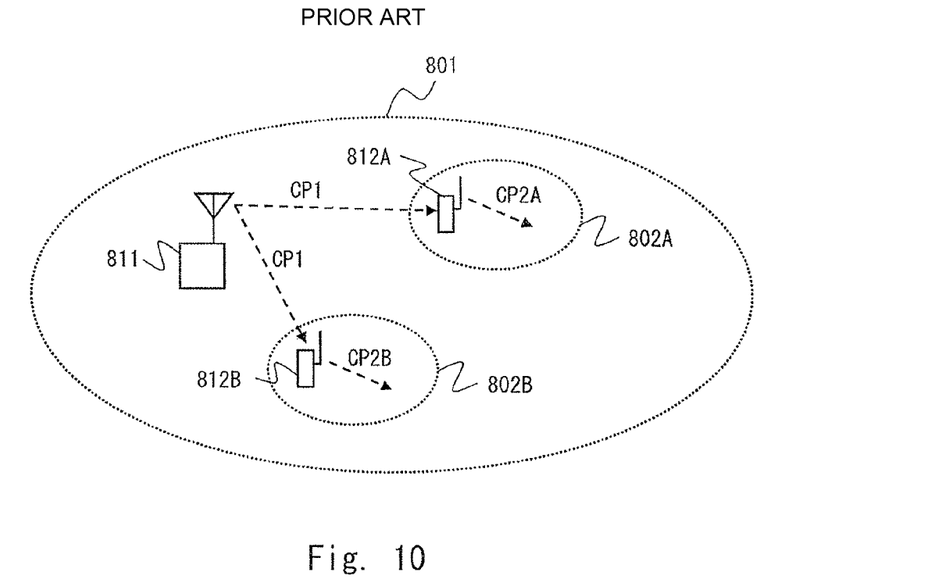
FIG. 10 is a configuration diagram of a radio communication system for explaining background art.

A specific example of a transmission power setting method for a femto base station disclosed in Patent document 1 is explained hereinafter with reference to FIG. 10. In FIG. 10, a macro base station 811 forms a macrocell 801 and transmits a common pilot signal CP1 with a constant transmission power to communicate with a mobile station (not shown). Femto base stations 812A and 812B form femtocells 802A and 802B respectively to communicate with a mobile station(s) (not shown). Further, each of the femto base stations 812A and 812B measures a received power Pmacro [dBm] of the common pilot signal CP1 of the macro base station 811, and they transmit common pilot signals CP2A and CP2B respectively with a transmission power Pmacro+ Poffset [dBm] by using the same radio frequency band as that of the macro base station 811. Note that Poffset is a power offset, and is a constant value common to all the femtocells 802A and 802B.

The femto base station like the one described above has been studied for use in systems such as W-CDMA (Wideband Code Division Multiple Access) and E-UTRAN (also called "LTE: Long Term Evolution"). In W-CDMA, data transmission is performed by using a dedicated channel, of which transmission power is controlled, on the uplink and the downlink, or is performed by using a shared channel on the downlink as described in 3GPP TS 25.214 V7.3.0. Further, in E-UTRAN, a radio frequency band is divided into a plurality of PRBs (Physical Resource Blocks) as described in 3GPP TS 36.300 V8.1.0. Specifically, a scheduler provided in an E-UTRAN base station assigns PRBs, and a base station performs data transmission with a mobile station by using an assigned PRB.

[Patent Document 1]
UK Patent Application Publication No. 2428937 A

DISCLOSURE OF INVENTION

Technical Problem

Figure 11:
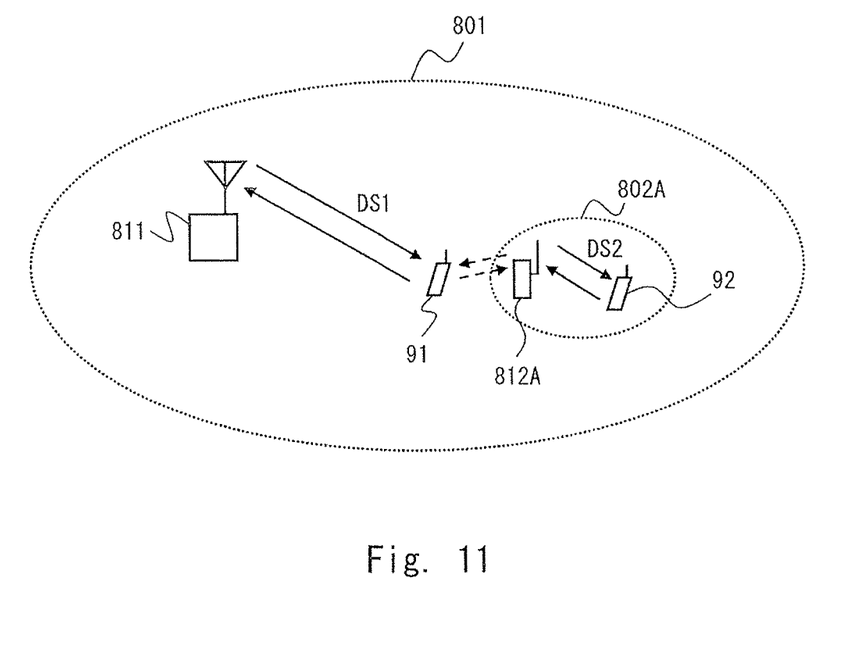
FIG. 11 shows a disposition of a femto base station for explaining a problem to be solved.

Assume a case where each of a macro base station 811 and a femto base station 812A shown in FIG. 10 communicates with a mobile station. As shown in FIG. 11, assume that a mobile station 91 connects to and communicates with the macro base station 811 and that a mobile station 92 connects to and communicates with the femto base station 812A. For example, when the femto base station 812A has a function of permitting only pre-registered mobile stations to connect to the femto base station 812A, the mobile station 92 is a registered mobile station that is registered in the femto base station 812A. Meanwhile, the mobile station 91 is an unregistered mobile station that is not registered in the femto base station 812A.

In the situation shown in FIG. 11, when the macro base station 811 and the femto base station 812A communicate with the mobile stations 91 and 92 respectively by using the same frequency band, the interference problem becomes prominent as described below. The downlink signal DS2 transmitted from the femto base station 812A to the mobile station 92 could interfere with the downlink signal DS1 transmitted from the macro base station 811 to the mobile station 91, and thereby deteriorating the quality of the downlink signal DS1. Further, if the macro base station 811 increases the transmission power of the downlink signal DS1 in order to avoid the quality deterioration of the downlink signal DS1, a problem that downlink capacity of the macro base station 811 is reduced arises.

In a method for setting a transmission power of a femto base station disclosed in Patent document 1, the transmission power of a common pilot signal of a femto base station is determined by adding a fixed power offset Poffset to the received power of a common pilot signal from a macro base station. That is, in the setting method disclosed in Patent document 1, the transmission power of a common pilot signal of a femto base station can be determined according to the received power of a common pilot signal from a macro base station.

However, considering the variety of installation environments of the femto base station 812A, the setting method disclosed in Patent document 1 might not be a satisfactory method. This is because, considering the fact that the femto base station 812A is installed inside a building, the level at which the downlink signal DS2 of the femto base station 812A leaks outside the building cannot be considered to be uniform since the loss of the radio signal caused by the building (hereinafter called "building penetration loss") is different from one building to another.

Therefore, in the method for determining a transmission power of a common pilot signal of a femto base station disclosed in Patent document 1, the interference that the femto base station 812A and the mobile station 92 exert on the communication between the macro base station 811 and the mobile station 91 could not be sufficiently suppressed.

Note that the radio parameter that affects the magnitude of interference on the downlink signal or the uplink signal of the mobile station 91 that connects to and communicates with the macro base station 811 is not limited to the above-described transmission power of a common pilot signal by the femto base station 812A. That is, any radio parameter that affects the magnitude of the transmission power of the femto base station 812A or the transmission power of the mobile station 92 that connects to and communicates with the femto base station 812A could affects the level of interference on the uplink signal or the downlink signal between the macro base station 811 and the mobile station 91. Examples of the radio parameters like this includes a maximum value of the total transmission power of the femto base station 812A, a target value of the total received power RTWP (Received Total Wideband Power) from the mobile station in the femto base station 812A, a maximum value of transmission power density of the femto base station 812A, a maximum value of the total transmission power of the mobile station 92, and a maximum value of transmission power density of the mobile station 92.

Note that the occurrence of the above-described interference problem is not limited to the cases where a femto base station is used. For example, it could be also problematic in radio ad-hoc networks in which radio stations autonomously form a network. That is, the above-described interference problem could commonly occur, in a situation where two radio stations are communicating, when another two radio stations perform communication in the vicinity of their communication site (e.g., in the outside or in another room separated by a wall).

The present invention has been made based on the above-described findings, and an object of the present invention is to provide a radio station apparatus that is able to, when communication is performed between two radio stations, effectively suppress interference on other radio stations located in the vicinity of them, a radio resource control method, a recording medium storing a radio station control program, and a radio communication system.

Technical Solution

A first aspect of the present invention includes a radio station apparatus that performs radio communication with at least one opposed radio station. The radio station apparatus includes first measurement means, calculation means, and determination means. The first measurement means measures reception quality of a first radio signal transmitted from a first radio station that is different from any of the radio station apparatus and the opposed radio station. The calculation means calculates an estimated loss value relating to a propagation loss between the first radio station and the radio station apparatus by using a measured value of the reception quality. The determination means determines a radio parameter relating to radio communication between the radio station apparatus and the opposed radio station based on the estimated loss value.

Further, a second aspect of the present invention includes a radio resource control method used by a radio station apparatus that performs radio communication with at least one opposed radio station. The method includes following steps (a), (b) and (c). The step (a) includes measuring reception quality of a first radio signal transmitted from a first radio station that is different from any of the radio station apparatus and the opposed radio station at an installation place of the radio station apparatus. The step (b) includes calculating an estimated loss value relating to a propagation loss between the first radio station and the radio station apparatus by using a measured value of the reception quality. The step (c) includes determining a radio parameter relating to radio communication between the radio station apparatus and the opposed radio station based on the estimated loss value.

Advantageous Effects

The magnitude of a propagation loss between the radio station apparatus in accordance with the above-described first aspect of the present invention and the first radio station located adjacent to the radio station apparatus can be used as an index indicating the degree of interference between a radio signal transmitted/received by the first radio station and a radio signal transmitted/received by the radio station apparatus. The magnitude of the propagation loss between the radio station apparatus and the first radio station varies according to the magnitude of the building penetration loss of a building within which the radio station apparatus is installed.

The radio station apparatus in accordance with the first aspect of the present invention can calculate an estimated loss value relating to the propagation loss between the radio station apparatus and the first radio station and determine a radio parameter relating to radio communication between the radio station apparatus and the opposed radio station based on the estimated loss value. The radio parameter, for example, includes a parameter that affects at least one of the magnitude of the transmission power of the radio station apparatus and the magnitude of the transmission power of the opposed radio station. That is, the radio station apparatus in accordance with the first aspect of the present invention is able to adjust at least one of the transmission power of the radio station apparatus and that of the opposed radio station while reflecting a difference in propagation loss between the radio station apparatus and the first radio station. The same holds true for a radio resource control method in accordance with the second aspect of the present invention. As a result, the radio station apparatus in accordance with the first aspect of the present invention as well as the radio resource control method in accordance with the second aspect of the present invention can suppress interference on another radio station(s) located in the vicinity (i.e., the first radio station).

EXPLANATION OF REFERENCE 1, 7 FEMTO BASE STATION
2 FEMTOCELL
3-1, 3-2 MOBILE STATION
4 MACRO BASE STATION
5 MACROCELL
10 ANTENNA
11 RADIO TRANSMISSION/RECEPTION UNIT
12 RECEPTION DATA PROCESSING UNIT
13 TRANSMISSION DATA PROCESSING UNIT
14 WIRED TRANSMISSION/RECEPTION UNIT
15, 75 RADIO RESOURCE CONTROL UNIT
16 MOBIL$_E$ STATION MODE RECEPTION UNIT
61 FEMTO GATEWAY APPARATUS
62 MACRO GATEWAY APPARATUS
90 BUILDING
151 RADIO NETWORK CONTROL UNIT
152 RADIO NETWORK CONTROL DATA SETTING UNIT
Pul_tx ESTIMATED UPLINK TRANSMISSION POWER VALUE
$L_E$ ESTIMATED LOSS VALUE
$L_P$ PROPAGATION LOSS
$L_A$ ATMOSPHERIC PROPAGATION LOSS
$L_B$ BUILDING PENETRATION LOSS
Nul THERMAL NOISE

BEST MODE FOR CARRYING OUT THE INVENTION

Specific exemplary embodiments to which the present invention is applied are explained hereinafter in detail with reference to the drawings. The same components are denoted by the same signs throughout the drawings, and duplicated explanation is omitted as appropriate for simplifying the explanation.

[First Exemplary Embodiment of the Invention]

Figure 1:
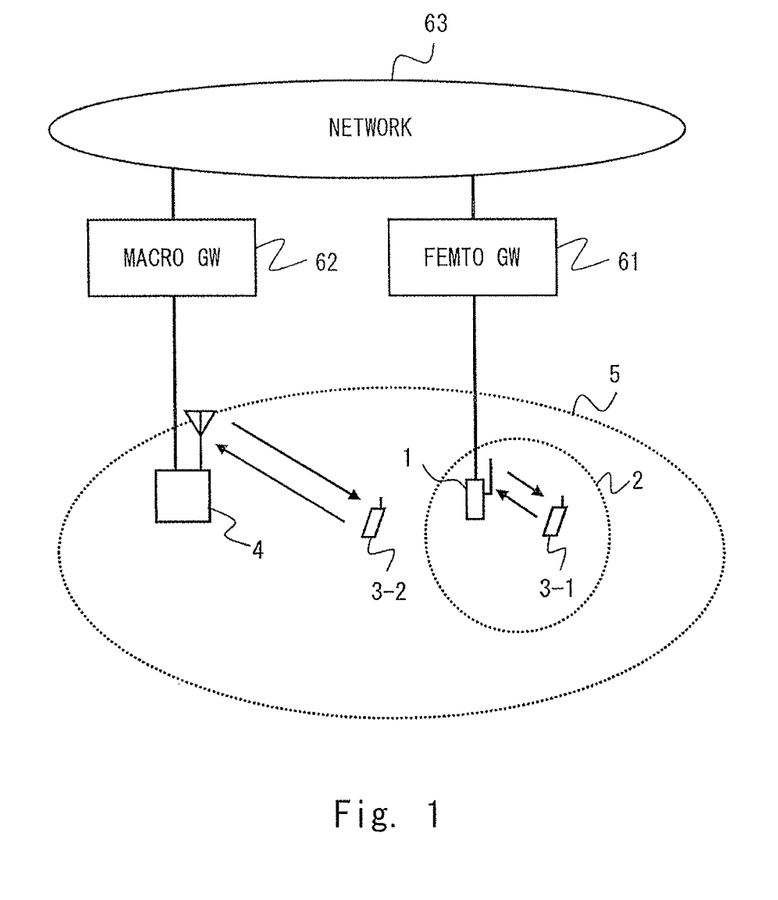
FIG. 1 is a configuration diagram of a radio communication system including a femto base station in accordance with a first exemplary embodiment of the present invention.

FIG. 1 is a configuration example of a radio communication system including a femto base station 1 in accordance with this exemplary embodiment. The following explanation is made on the assumption that the radio communication system in accordance with this exemplary embodiment is a radio communication system adopting an FDD (Frequency division Dupulex)-CDMA mode, more specifically a W-CDMA mode.

In FIG. 1, the femto base station 1 forms a femtocell 2. The size of the femtocell 2 is defined by the range within which a common pilot signal (CPICH: Common Pilot Channel) transmitted by the femto base station 1 can be received. In the following explanation, a CPICH transmitted by the femto base station 1 is referred to as "femto CPICH".

A macro base station 4 forms a macrocell 5 that is overlaid over the femtocell 2. The size of the macrocell 5 is defined by the range within which a CPICH transmitted by the macro base station 4 can be received. In the following explanation, a CPICH transmitted by the macro base station 4 is referred to as "macro CPICH".

A mobile station 3-1 connects to and communicates with the femto base station 1 in the femtocell 2. Meanwhile, a mobile station 3-2 is not permitted to connect to the femto base station 1. Therefore, even if the mobile station 3-2 is located in a place at which the reception quality of a CPICH from the femto base station 1 exceeds that of a CPICH from the macro base station 4, the mobile station 3-2 connects to and communicates with the macro base station 4. For example, if the femto base station 1 has a function of permitting only pre-registered mobile stations to connect to the femto base station 1, the mobile station 3-1 is "registered mobile station" that is registered in the femto base station 1. Meanwhile, the mobile station 3-2 is "unregistered mobile station" that is not registered in the femto base station 1. Note that the femto base station 1 may have such a function that mobile stations are permitted to connect unless the number of connected mobile stations does not exceed a predetermined upper limit. In such a case, the mobile station 3-2 is a mobile station that is refused to connect to the femto base station 1 because of excessive number of the connected mobile stations. In the following explanation, the mobile station 3-1, which connects to the femto base station 1, is called "femto mobile station", while the mobile station 3-2, which connects to the macro base station 4, is called "macro mobile station".

A femto gateway apparatus 61 is connected to the femto base station 1 and also connected to an upper network 63. The femto gateway apparatus 61 controls communication and performs information transmission between the upper network 63 and the femto mobile station 3-1 located within the femtocell 2 formed by the subordinate femto base station 1.

Similarly to the femto gateway apparatus 61, a macro gateway apparatus 62 controls communication and performs information transmission between the upper network 63 and the macro mobile station 3-2 located within the macro cell 5 formed by the subordinate macro base station 4.

The femto base station 1 is a base station that can be installed inside a building such as inside user's house. The femto base station 1 in accordance with this exemplary embodiment has a function of adjusting a radio parameter in order to suppress interference that is exerted on communication between the macro base station 4 and the macro mobile station 3-2 connecting to the macro base station 4 by radio waves leaked from the femto base station 1 and the femto mobile station 3-1 connecting to the femto base station 1 to the outside of the building. Note that the radio parameter is a parameter(s) relating to a radio resource(s) used in communication between the femto base station 1 and the femto mobile station 3-1. Details of the procedure for determining a radio parameter performed by the femto base station 1 are explained later.

Note that, needless to say, FIG. 1 shows only a few components for the sake of explanation of the present invention. For example, the radio communication system in accordance with this exemplary embodiment may include a lot of other femto base stations and mobile stations in addition to those shown in FIG. 1.

Figure 2:
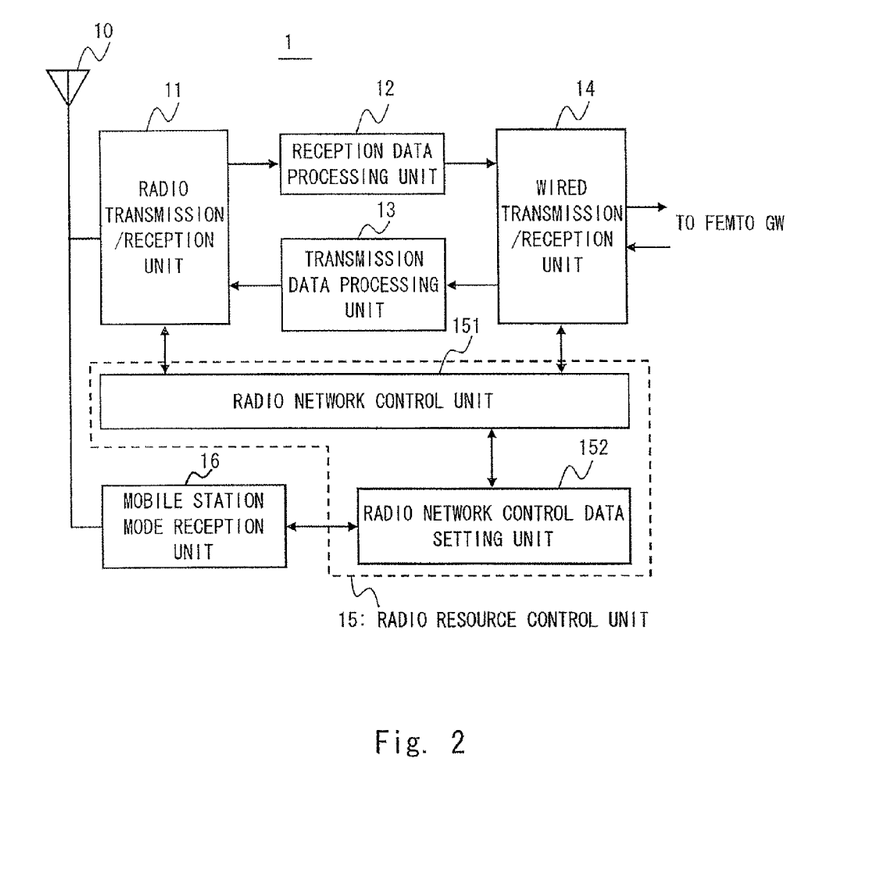
FIG. 2 is a block diagram of a femto base station in accordance with a first exemplary embodiment of the present invention.

Next, a configuration example of the femto base station 1 and a specific example of a radio parameter determination procedure are explained hereinafter in detail. FIG. 2 is a block diagram showing a configuration of a femto base station 1.

A radio transmission/reception unit 11 receives an uplink signal transmitted from the femto mobile station 3-1 through an antenna 10, and outputs a downlink signal to be transmitted to the femto mobile station 3-1 to the antenna 10. Further, the radio transmission/reception unit 11 measures the total received power RTWP (Received Total Wideband Power) from a mobile station within the frequency range used for the uplink signal transmission. The measured RTWP is used to determine a radio parameter, which is described later.

A reception data processing unit 12 performs demodulation processing on an uplink signal received by the radio transmission/reception unit 11, and supplies the obtained uplink data to a wired transmission/reception unit 14. A transmission data processing unit 13 receives downlink data to be transmitted from the wired transmission/reception unit 14 to the mobile station, performs processing including error correction encoding and interleaving, and then supplies the processed downlink data to the radio transmission/reception unit 11. The wired transmission/reception unit 14 functions as an interface that transmits/receives uplink/downlink data to/from the femto gateway apparatus 61.

A radio resource control unit 15 supplies a radio parameter(s) relating to a radio resource(s), which is used when the radio transmission/reception unit 11 transmits/receives a radio signal, to the radio transmission/reception unit 11. At least one parameter that affects the magnitude of the transmission power of the femto base station 1 or the magnitude of the transmission power of the femto mobile station 3-1 is included in a plurality of radio parameters that are designated by the radio resource control unit 15. Specific examples of the radio parameter that affects the magnitude of the transmission power of the femto base station 1 include transmission power P_tx of a femto CIPCH, a maximum value of the total transmission power of the femto base station 1, and a maximum value of transmission power density of the femto base station 1. Meanwhile, specific examples of the radio parameter that affects the magnitude of the transmission power of the femto mobile station 3-1 include a target value RTWP_target of the total received power RTWP of the femto base station 1, a target value of Ec/No (Received Energy per chip/power density), a target value of SIR (Signal to Interference ratio), a maximum value of the total transmission power of the mobile station, and a maximum value of transmission power density of the mobile station.

Note that in the configuration example shown in FIG. 2, the radio resource control unit 15 includes a radio network control unit 151 and a radio network control data setting unit 152. The radio network control unit 151, which has a function as a radio network controller (hereinafter called "RNC"), supplies radio parameters such as a used frequency band, a CPICH transmission power P_tx, a maximum value of the total transmission power of all the downlink channels, and a target value RTWP_target of the total uplink received power to the radio transmission/reception unit 11. Note that in the configuration example shown in FIG. 2, the value of a radio parameter(s) such as CPICH transmission power P_tx and a target value RTWP_target of the total uplink received power is determined by the radio network control data setting unit 152.

The radio network control data setting unit 152 receives a notification of reception quality of a macro CPICH measured by a mobile station mode reception unit 16. Further, the radio network control data setting unit 152 receives a measured value of RTWP within the frequency range of the uplink signal measured by the radio transmission/reception unit 11. The radio network control data setting unit 152 determines a radio parameter that affects the magnitude of the transmission power of the femto base station 1 or the magnitude of the transmission power of the femto mobile station 3-1 by using the measured value of the reception quality of a macro CPICH and the measured value of RTWP.

The mobile station mode reception unit 16 receives the macro CPICH transmitted from the macro base station 4 that forms the macrocell 5 overlaid over the femtocell 2 through the antenna 10, and measures the reception quality of the macro CPICH. The reception quality measured by the mobile station mode reception unit 16 may be any physical quantity that varies according to the attenuation of the macro CPICH. In the case of the W-CDMA mode, the mobile station mode reception unit 16 may measure RSCP (Received Signal Code Power), Ec/No, or SIR of the macro CPICH as the reception quality of the macro CPICH.

Next, a specific example of a procedure for determining a radio parameter performed by the femto base station 1 is explained. In this example, a case where a transmission power offset P_tx_offset used to determine the femto CPICH transmission power P_tx of the femto base station 1 and the target value RTWP_target of the total uplink received power that the femto base station 1 receives from the mobile station are determined is explained in a concrete manner. The femto CPICH transmission power P_tx may be determined by the following equation (1) by using P_tx_offset. In the equation, RSCP0 is a measured value of RSCP of the macro CPICH by the mobile station mode reception unit 16.

$$P\_tx = RSCP0 + P\_tx\_\text{offset [dBm]} \quad (1)$$

Figure 3:
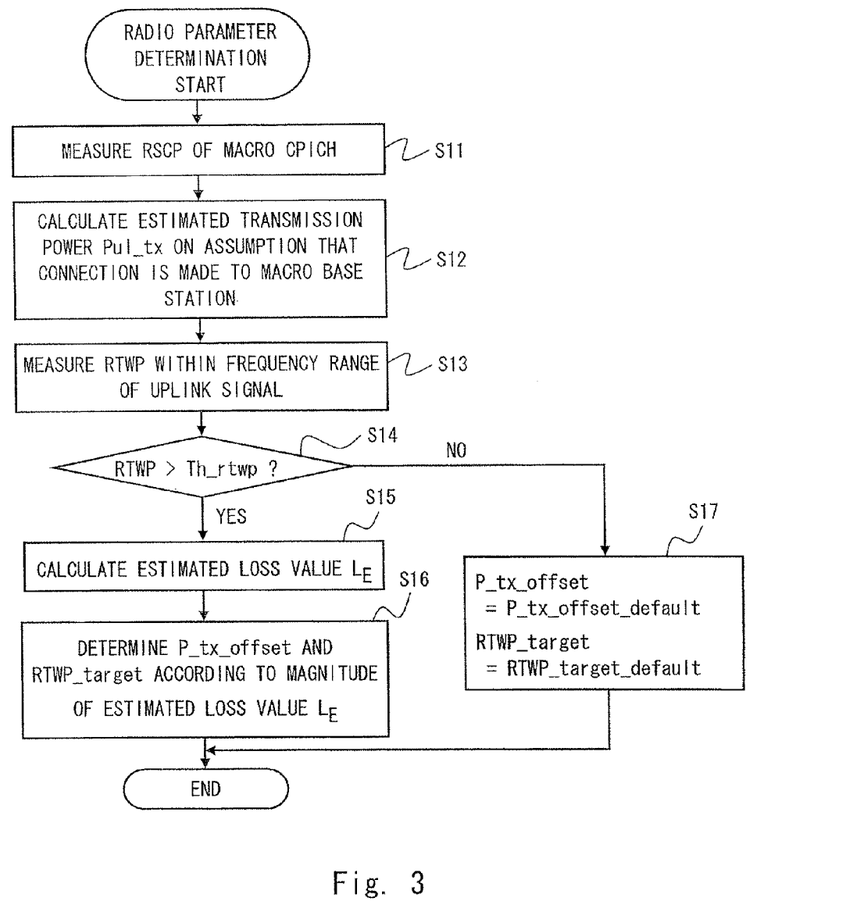
FIG. 3 is a flowchart showing a radio parameter adjustment procedure performed by a femto base station in accordance with a first exemplary embodiment of the present invention.

FIG. 3 is a flowchart showing a procedure for determining P_tx_offset and RTWP_target performed by the femto base station 1. In a step S11, the mobile station mode reception unit 16 measures a received power level RSCP0 of a macro CPICH.

In a step S12, the radio network control data setting unit 152 calculates a transmission power value (hereinafter called "estimated transmission power value") Pul_tx on the assumption that the femto base station 1 connects to the macro base station 4 as a mobile station. The calculation of the estimated transmission power value Pul_tx is performed by using information based on a downlink signal transmitted from the macro base station 4. For example, in the case of open loop transmission power control (Open Loop Power Control) in W-CDMA, the transmission power of an uplink signal by a mobile station is determined according to a measured value of RSCP of CPICH transmitted from a base station. That is, the received power level RSCP0 of a macro CPICH may be used as the information based on the downlink signal transmitted from the macro base station 4. Specifically, the radio network control data setting unit 152 may calculates Pul_tx in accordance with the operation of a mobile station of W-CDMA by using the received power level RSCP0 of a macro CPICH.

A specific example of the method for determining Pul_tx by the open loop transmission power control is described in Chapter 8.5.3 of specifications 3GPP TS 25.331 V8.1.0 by 3GPP (The 3rd Generation Partnership Project) as a method for determining an initial transmission power of DPCCH (Dedicated Physical Control Channel). The calculating formula of Pul_tx described in 3GPP TS 25.331 V8.1.0 is shown below as an equation (2).

$$DPCCH\_\text{Initial\_power} = DPCCH\_\text{Power\_offset} - CPICH\_RSCP \quad (2)$$

In the equation, "DPCCH_Initial_power" corresponds to Pul_tx. DPCCH_Power_offset is broadcast information from the upper network 5. Further, CPICH_RSCP in the equation (2) is a measured value of RSCP of CPICH by a mobile station.

Note that the calculation of Pul_tx in the step S12 may be also performed based on closed loop transmission power control (Closed Loop Power Control) described in 3GPP TS 25.214 V7.3.0. In the closed loop transmission power control, the transmission power of an uplink signal by a mobile station is determined according to transmission power increase/decrease information transmitted from the macro base station 4. That is, transmission power increase/decrease information contained in a downlink signal is used as the information based on the downlink signal transmitted from the macro base station 4. Specifically, the radio network control data setting unit 152 may extract transmission power increase/decrease information from a downlink signal of the macro base station 4 received by the radio transmission/reception unit 11, and calculate Pul_tx by referring to this information.

In a step S13, the radio transmission/reception unit 11 measures RTWP within the frequency range of the uplink signal. To eliminate the influence from the femto mobile station 3-1 connecting to the femto base station 1 as much as possible, the measurement of RTWP is preferably performed during the period in which the femto mobile station 3-1 are not performing any data transmission. Further, to eliminate the influence of temporary signal fluctuations, the measurement of RTWP may be repeatedly performed at predetermined regular intervals. In addition, an average value or a median value of results of multiple measurements may be used as a measured value of RTWP. Further, when the macro mobile station 3-2 is performing high-speed data communication such as HSUPA (High Speed Uplink Packet Access), the transmission power is temporarily increased. Therefore, if RTWP is greater than a predetermined value that is determined in advance according to a transmission power at the time of HSUPA, RTWP may be measured again or an average value may be calculated after eliminating values equal to or greater than the predetermined value.

In a step S14, the measured value of RTWP is compared with a threshold Th_rtwp. When the measured value of RTWP is sufficiently small, it indicates that there is no macro mobile station 3-2 connecting to the macro base station 4 near the femto base station 1. Further, when the measured value of RTWP is sufficiently large, an approximate formula of RTWP, which is described later, can be applied. Therefore, when the measured value of RTWP is lower than the threshold Th_rtwp, the radio network control data setting unit 152 determines P_tx_offset and RTWP target in accordance with the following equations (3) and (4).

$$P\_tx\_offset = P\_tx\_offset\_default \quad (3)$$

$$RTWP\_target = RTWP\_target\_default \quad (4)$$

In the equations, P_tx_offset_default is a predefined reference value for P_tx_offset. Further, RTWP_target_default is a predefined reference value for RTWP_target. That is, in the step S17, the calculation of an estimated loss value $L_E$ relating to a propagation loss between the macro mobile station 3-2 and the femto base station 1 as well as the determination of P_tx_offset and RTWP target according to the magnitude of the estimated loss value $L_E$ are not performed.

As described above, the determination in the step S14 is a condition used to determine that the macro mobile station 3-2 is located near the femto base station 1. Therefore, in the step S 14, instead of or in addition to the threshold determination for the magnitude of the measured value of RTWP, it may be determined whether or not a connection request from the macro mobile station 3-2 has been received in the femto base station 1. Note that specific examples of the connection request transmitted from a mobile station include a call-in from a mobile station, a reception of a position registration request that is transmitted from a mobile station as a cell selection operation is performed upon power-up of the mobile station, and a reception of a position registration request that is transmitted from a mobile station as a cell re-selection operation is performed upon change of the cell within which the mobile station is located.

On the other hand, when the measured value of RTWP is determined to be equal to or greater than the threshold Th_rtwp, the radio network control data setting unit 152 calculates an estimated loss value $L_E$ (step S15). Note that the estimated loss value $L_E$ is an estimated value relating to the magnitude of a propagation loss $L_P$ between the macro mobile station 3-2 and the femto base station 1. Specific examples of the estimated loss value include an estimated value of a propagation loss $L_P$, and an estimated value of a building penetration loss $L_B$ included in a propagation loss $L_P$.

In a step S16, the radio network control data setting unit 152 determines P_tx_offset and RTWP_target according to the magnitude of the estimated loss value $L_E$. Specifically, P_tx_offset and RTWP_target may be determined such that the transmission power of the femto base station 1 and the transmission power of the femto mobile station 3-1 increase with the increase in the estimated loss value $L_E$. The following equations (5) and (6) are a specific example of the calculating formulas of P_tx_offset and RTWP_target.

$$P\_tx\_offset = \mathrm{MEDIAN}(P\_tx\_offset\_default + A1*L_E, P\_tx\_offset\_max, P\_tx\_offset\_min) \quad (5)$$

$$RTWP\_target = \mathrm{MEDIAN}(RTWP\_target\_default + B1*L_E, RTWP\_target\_max, RTWP\_target\_min) \quad (6)$$

In the equations, A1 and B1 are a positive constant. P_tx_offset_max is a value that is predefined as an upper-limit value of P_tx_offset. P_tx_offset_min is a value that is predefined as a lower-limit value of P_tx_offset. RTWP target max is a value that is predefined as an upper-limit value of RTWP target. RTWP target min is a value that is predefined as a lower-limit value of RTWP target. Further, the function MEDIAN( ) is a function to obtain a median value from among a plurality of values designated as the arguments.

Figure 4:
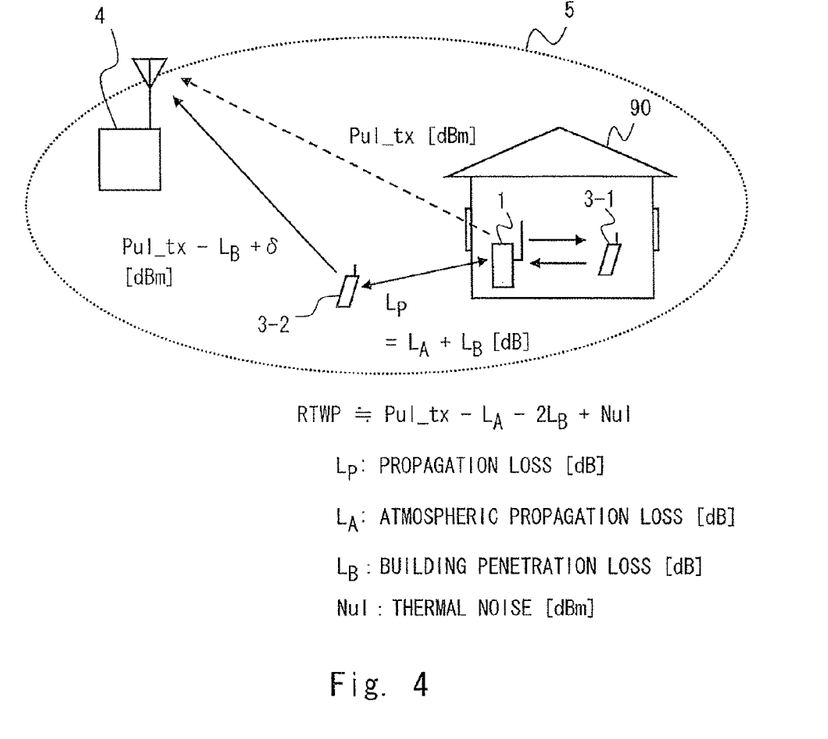
FIG. 4 is a schematic diagram for explaining a radio parameter adjustment procedure performed by a femto base station in accordance with a first exemplary embodiment of the present invention.

Next, several specific examples of the estimated loss value $L_E$ are explained hereinafter. FIG. 4 schematically shows the femto base station 1 installed inside the building 90. When the femto base station 1 is installed inside the building 90, the propagation loss $L_P$ that is caused when an uplink signal transmitted by the macro mobile station 3-2 located outside the building arrives at the femto base station 1 can be expressed as the sum of an atmospheric propagation loss $L_A$ and a building penetration loss $L_B$ by the following equation (7). Note that the atmospheric propagation loss $L_A$ is a propagation loss of an uplink signal propagating through the atmosphere. The building penetration loss $L_B$ is a loss that is caused when an uplink signal passes through the building 90.

$$L_P = L_A + L_B \; [\mathrm{dB}] \quad (7)$$

Further, as shown in FIG. 4, the transmission power Pul_tx_macro of the macro mobile station 3-2 connecting to the macro base station 4 can be expressed by the following equation (8) by using the estimated transmission power value Pul_tx estimated by the femto base station 1. In the equation, δ is a difference that occurs based on the distance difference between a distance DF between the macro base station 4 and the femto base station 1 and a distance between the macro base station 4 and the macro mobile station 3-2.

$$Pul\_tx\_macro = Pul\_tx - L_B + \delta \; [\mathrm{dBm}] \quad (8)$$

By using the equations (7) and (8), the RTWP measured value by the femto base station 1 can be expressed by the following equation (9). In the equation, Δ represents contribution by macro base stations other than the femto mobile station 3-1 and the macro mobile station 3-2 for which the measurement is performed. Further, Nul represents thermal noise.

$$RTWP = Pul\_tx\_\text{macro} - L_P + \Delta + Nul = (Pul\_tx - L_B + \delta) - (L_A + L_B) + \Delta + Nul = Pul\_tx - L_A - 2L_B + \delta + \Delta + Nul \text{ [dBm]} \quad (9)$$

In the case where the macro mobile station 3-2 is located sufficiently close to the femto base station lenogh that transmission signal of the femto base station 1 arrives at the macro base station 3-2, the above-described difference between the distance DF and the distance DM becomes smaller. Therefore, $\delta$ in the equation (9) can be ignored. Further, when the macro mobile station 3-2 is located sufficiently close to the femto base station 1, it can be presumed that the contribution to RTWP by the macro mobile station 3-2, which is located in the vicinity, becomes dominant. Therefore, $\Delta$ in the equation (9) can be also ignored. Accordingly, in this situation, the measured value of RTWP by the femto base station 1 can be approximated by the following equation (10).

$$RTWP = Pul\_tx - L_A - 2L_B + Nul \text{ [dBm]} \quad (10)$$

Figure 5:
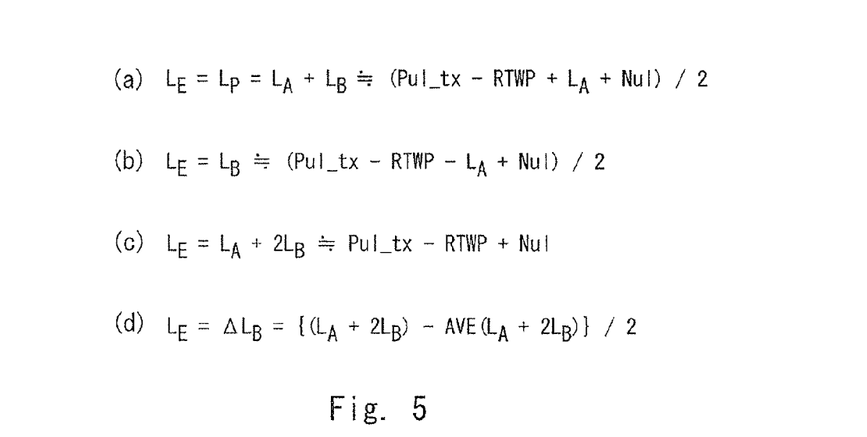
FIG. 5 shows calculating formulas relating a specific example of an estimated loss value $L_E$.

FIG. 5 shows four specific examples of the estimated loss value $L_E$. By applying the equation (10), each of the equations of the estimated loss value $L_E$ in FIG. 5 is expressed by using Pul_tx and RTWP. The estimated loss value $L_E$ shown in FIG. 5(a) is an estimated value of a propagation loss $L_P$. The estimated loss value $L_E$ shown in FIG. 5(b) is an estimated value of a building penetration loss $L_B$. Note that since the estimated loss values $L_E$ in the FIGS. 5(a) and 5(b) include an atmospheric propagation loss $L_A$ at the rightmost side of the equation, it is necessary to provide an estimated value of the atmospheric propagation loss $L_A$ to the femto base station 1 in advance. For example, an empirical value that is obtained according to a typical distance between a place inside the building within which the femto base station is installed and a place outside the building where an unrelated person can pass through may be used as an estimated value of the atmospheric propagation loss $L_A$.

Further, the estimated loss value $L_E$ shown in FIG. 5(c) is an estimated value of $L_A + 2L_B$. The value $L_A + 2L_B$ in FIG. 5(c) is characteristic in that the atmospheric propagation loss $L_A$ is not included at the rightmost side of the equation. When an estimated loss value $L_E$ is calculated by using FIG. 5(c), P_tx_offset and RTWP_target may be calculated by substituting the obtained calculation result into the equations (5) and (6). Further, a correspondence table or a function indicating a correspondence relation between the magnitude of $L_A + 2L_B$ and the magnitude of $L_P$ or a correspondence relation between the magnitude of $L_A + 2L_B$ and the magnitude of $L_B$ may be provided in the femto base station 1 in advance. In such a case, an estimated value of the propagation loss $L_P$ or the building penetration loss $L_B$ corresponding to the estimated loss value $L_E$ calculated by using FIG. 5(c) may be determined base on the correspondence table or the function, and the determined estimated value may be substituted for $L_E$ in the equations (5) and (6).

Finally, the estimated loss value $L_E$ shown in FIG. 5(d) is an estimated value of $\Delta L_B$. Note that $\Delta L_B$ is a difference between the building penetration loss $L_B$ of the building 90 within which the femto base station 1 is installed and the average value of building penetration losses $L_B$ measured by a plurality of femto base stations. AVE($L_A + 2L_B$) at the rightmost side of FIG. 5(d) represents an average value of $L_A + 2L_B$ calculated by a plurality of femto base stations by using the equation of FIG. 5(c). AVE($L_A + 2L_B$) may be stored in advance in a non-volatile storage device (not shown) such as a HDD (Hard Disk Drive) and an EEPROM (Electrically Erasable and Programmable Read Only Memory) to which the femto base station 1 can access.

Figure 6:
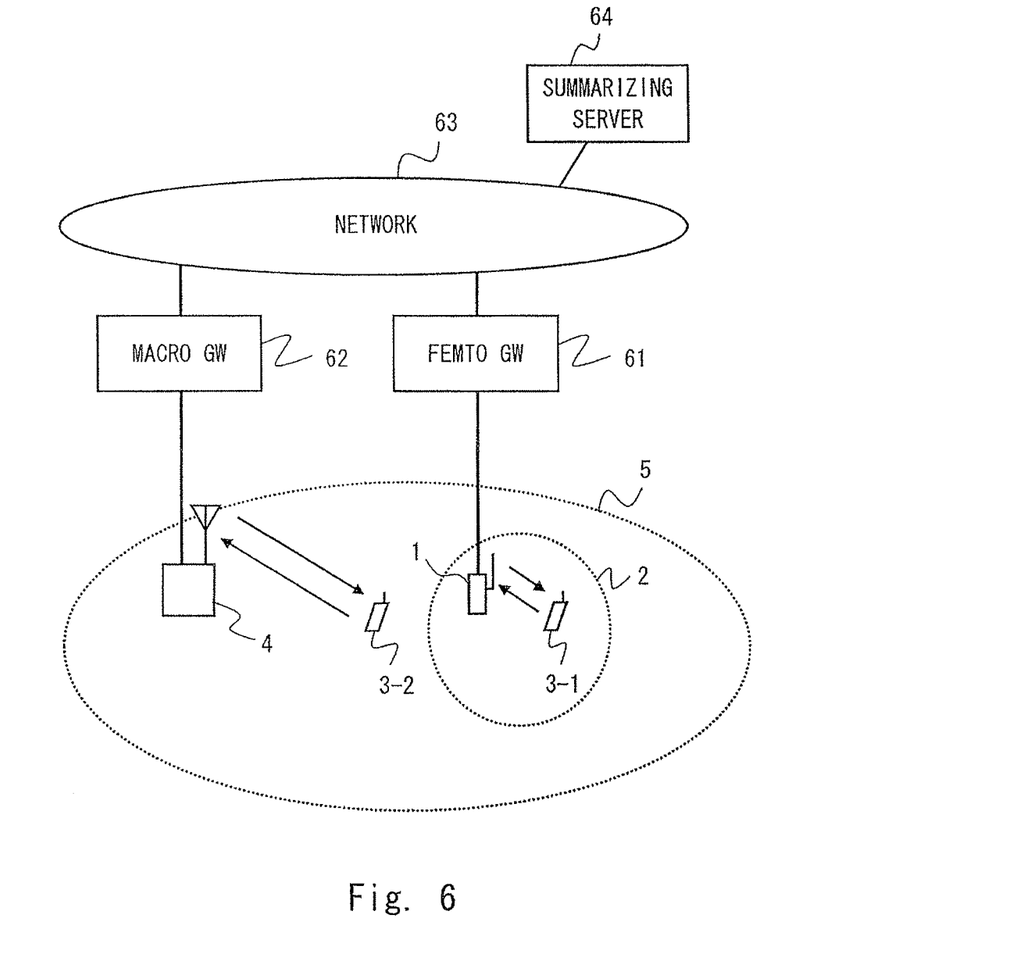
FIG. 6 is another example of a configuration of a radio communication system including a femto base station in accordance with a first exemplary embodiment of the present invention.

Further, AVE($L_A + 2L_B$) may be supplied from the upper network 63 to the femto base station 1. In this case, as shown in FIG. 6, a summarizing server 64 may be installed within the upper network 63. The summarizing server 64 receives a calculation result of $L_A + 2L_B$ performed by a plurality of femto base stations, calculates an average value AVE($L_A + 2L_B$), and supplies the calculated value to each of the femto base stations. Note that there is no particular restriction on the connection place of the summarizing server 64 provided that the summarizing server 64 is connected to a network to which the femto base station 1 can communicate (e.g., Internet).

As described above, the femto base station 1 in accordance with this exemplary embodiment measures RTWP within the frequency range used for transmission of the uplink signal of the macro mobile station 3-2. Then, the femto base station 1 calculates an estimated loss value $L_E$ relating to a propagation loss $L_P$ by using the measured value of RTWP. Further, the femto base station 1 determines a radio parameter(s) (e.g., CPICH transmission power P_tx and target value RTWP_target of the total uplink received power) that affects the magnitude of the transmission power of the femto base station 1 or the magnitude of the transmission power of the femto mobile station 3-1 based on the estimated loss value $L_E$. That is, the femto base station 1 can control the transmission powers of the femto base station 1 and the femto mobile station 3-1 according to the magnitude of the estimated loss value $L_E$ relating to the propagation loss $L_P$. Therefore, the femto base station 1 can effectively suppress interference on another radio station(s) located in the vicinity, i.e., on the macro mobile station 3-2.

[Second Exemplary Embodiment of the Invention]

The above-described femto base station 1 includes the mobile station mode reception unit 16 used to measure the reception quality of a macro CPICH. Since the transmission power of the macro mobile station 3-2 is determined according to the reception quality level of a macro CPICH, the mobile station mode reception unit 16 is indispensable to obtain an estimated transmission power value Pul_tx on the assumption that the femto base station 1 connects to the macro base station 4. Further, as shown in the equation (1), the mobile station mode reception unit 16 is indispensable to determine the transmission power of a femto CPICH by using the reception level of a macro CPICH as a reference.

However, when the transmission power of the macro mobile station 3-2 is not determined according to the reception quality level of a macro CPICH and when the transmission power of a femto CPICH is not determined by using the reception level of a macro CPICH as a reference, the mobile station mode reception unit 16 is not necessarily indispensable. Further, the femto base station 1 does not necessarily have to include the RNC function, and the RNC function may be disposed within the upper network 63.

Figure 7:
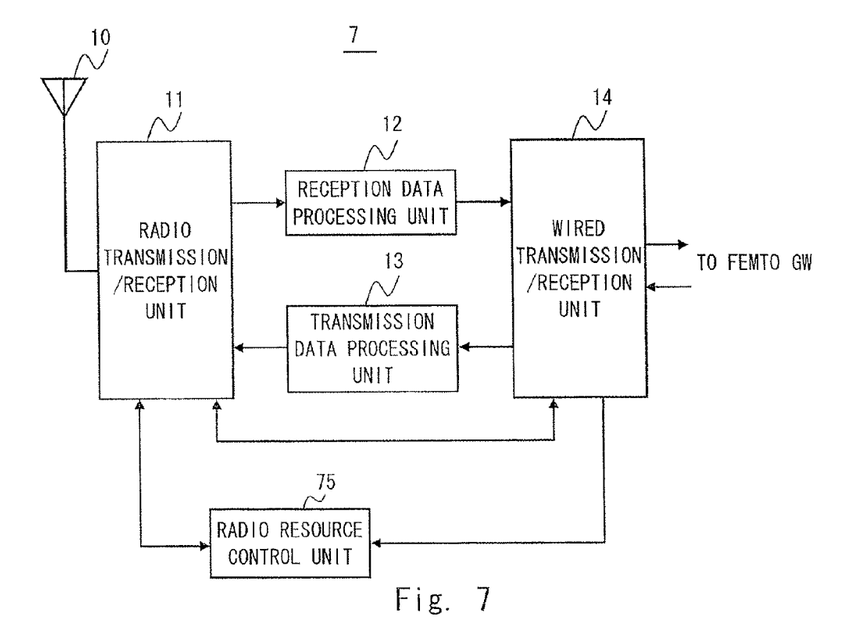
FIG. 7 is a block diagram of a femto base station in accordance with a second exemplary embodiment of the present invention.

A femto base station 7 in accordance with this exemplary embodiment is applied to a radio communication system in which the transmission power of the macro mobile station 3-2 is determined in a fixed manner irrespective of the reception quality level of the macro CPICH. FIG. 7 is a block diagram showing a configuration of a femto base station 7 in accordance with this exemplary embodiment. The femto base station 7 receives a notification of radio parameters such as a used frequency to be applied to the wireless transmission/reception unit 11 and a transmission power of a common pilot signal from an RNC disposed on the upper network 63.

In FIG. 7, a radio resource control unit 75 determines a radio parameter by using an RTWP measured value measured by the radio transmission/reception unit 11. For example, when the above-described P_tx_offset and RTWP_target are to be determined as radio parameters, the radio resource control unit 75 may perform processes in the step S13 and subsequent steps in the flowchart shown in FIG. 3 by cooperating with other components such as the radio transmission/reception unit 11.

Figure 8:
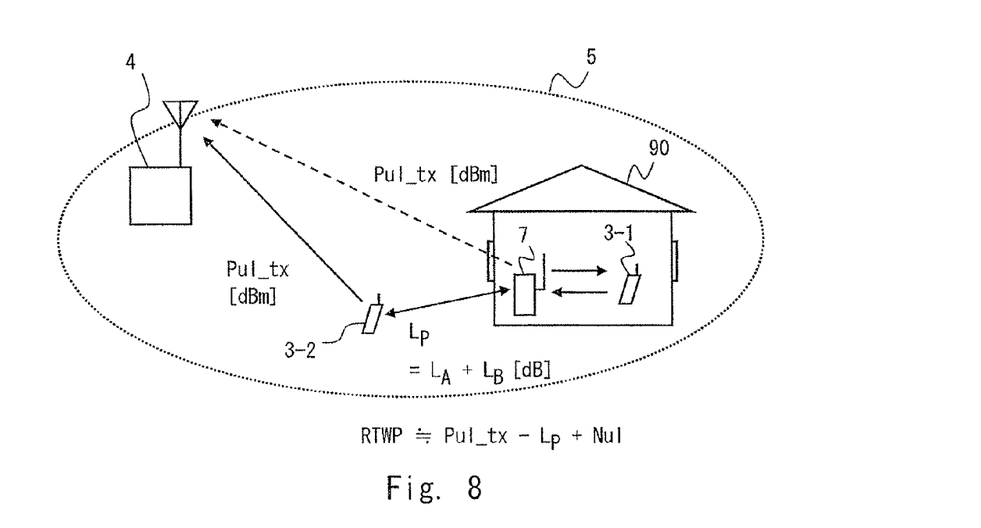
FIG. 8 is a schematic diagram for explaining a radio parameter adjustment procedure performed by a femto base station in accordance with a first exemplary embodiment of the present invention.

FIG. 8 schematically shows the femto base station 7 installed inside a building 90. The difference from first exemplary embodiment of the invention shown in FIG. 4 is that the transmission power of the macro mobile station 3-2 is determined in a fixed manner. The transmission power Pul_tx of the macro mobile station 3-2 has the same value as the transmission power Pul_tx that is exhibited when the femto base station 7 is assumed to connect the macro base station 4 as a mobile station. Therefore, the measured value of RTWP can be approximately expressed by the following equation (11) in this exemplary embodiment.

$$RTWP=Pul\_tx-L_P+Nul=Pul\_tx-L_A-L_B+Nul \text{ [dBm]} \quad (11)$$

Figure 9:
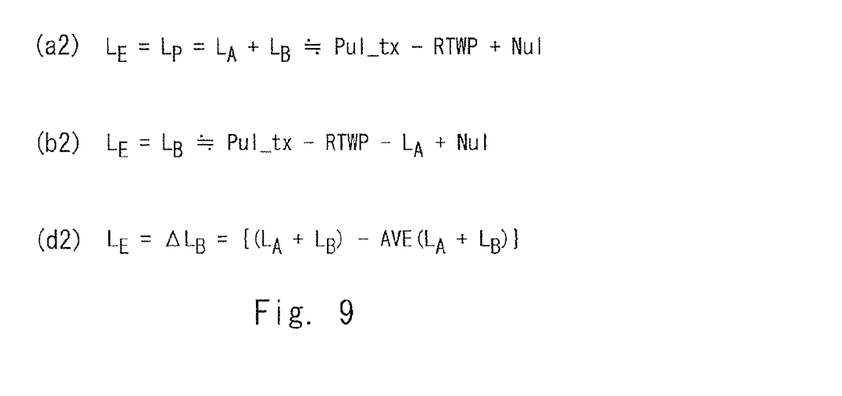
FIG. 9 shows calculating formulas relating a specific example of an estimated loss value $L_E$.

FIG. 9 shows a specific example of an estimated loss value $L_E$ in this exemplary embodiment. The estimated loss value $L_E$ shown in FIG. 9($a2$) is an estimated value of a propagation loss $L_P$ and corresponds to the above-described estimated value shown in FIG. 5($a$). The estimated loss value $L_E$ shown in FIG. 9($b2$) is an estimated value of a building penetration loss $L_B$ and corresponds to the estimated value shown in FIG. 5($b$). Further, the estimated loss value $L_E$ shown in FIG. 9($d2$) is an estimated value of $\Delta L_B$ and corresponds to the estimated value shown in FIG. 5($d$). Note that in the FIG. 9($d2$), AVE ($L_A+L_B$) represents an average value of $L_A+L_B$ calculated by a plurality of femto base stations. The value of AVE($L_A+L_B$) may be stored in the femto base station 7 in advance or supplied from the upper network 63 to the femto base station 7.

The femto base station 1 in accordance with this exemplary embodiment can also effectively suppress interference on the macro mobile station 3-2 as in the case of the above-described femto base station 1.

[Other Exemplary Embodiments]

Among the radio parameter determination processes described above in the first and second exemplary embodiments of the invention, arithmetic processing portions other than the RSCP measurement of a macro CPICH and the RTWP measurement process, i.e., the calculation of an estimated loss value $L_E$, the calculation of radio parameters using an estimated loss value $L_E$, and the like may be performed by a apparatus disposed on the upper network 63, e.g., an RNC. In such a case, the radio resource control units 15 and 75 may receive determined radio parameters from the upper network 63, and supply the received radio parameters to the radio transmission/reception unit 11. That is, the task of each arithmetic process included in the radio parameter determination procedure, which are explained above as being performed by the femto base stations 1 and 7, can be arbitrarily shared between the femto base stations 1 and 7 and the upper network 63 to which they are connected.

In the above-described first and second exemplary embodiments of the invention, cases where the present invention is applied to a radio communication system adopting a W-CDMA mode are explained. However, there is no particular restriction on the radio communication mode to which the present invention is applied. For example, the present invention can be also applied to radio communication systems adopting a TDD (Time Division Duplex) mode in which the same radio frequency is used in both the uplink and downlinks in a time-division manner. Further, for example, the present invention can be also applied to radio communication systems adopting an E-UTRAN mode instead of the W-CDMA mode.

Further, in the above-described first and second exemplary embodiments of the invention, cases where the present invention is applied to a femto base station are explained. However, the present invention can be also applied, for example, to each of a plurality of radio stations that autonomously form a radio ad-hoc network.

Further, the radio parameter adjustment procedure shown in FIG. 3 can be implemented as a program that is executed in a computer such as a microprocessor. The program can be stored in various types of storage media, or can be transmitted through a communication medium. Example of the storage media include flexible discs, hard disk drives, magnetic discs, magneto-optic discs, CD-ROMs, DVDs, ROM cartridges, RAM memory cartridges with battery backup, flash memory cartridges, and nonvolatile RAM cartridges. Further, examples of the communication medium include wired communication media such as telephone lines, wireless communication media such as microwave lines, and Internet.

Further, the present invention is not limited to the above-described exemplary embodiments, and needless to say, various modifications can be made within the limits that do not depart from the spirit of the present invention described above.

This application is based upon and claims the benefit of priority from Japanese patent application No. 2008-092205, filed on Mar. 31, 2008, the disclosure of which is incorporated herein in its entirety by reference.

INDUSTRIAL APPLICABILITY

The present invention can be used in radio resource control techniques used in communication between radio stations.

The invention claimed is:

1. A base station apparatus that performs radio communication with at least one first mobile station, comprising:
    a measurement unit including:
        a first measurement unit adapted to measure reception quality of an uplink signal transmitted from at least one second mobile station that is different from said at least one first mobile station and communicates with a first base station different from the base station apparatus; and
        a second measurement unit adapted to measure a downlink signal from the first base station;
    a calculation unit including:
        a first calculation unit adapted to calculate an estimated transmission power of the base station using the information of the downlink signal from the first base station; and
        a second calculation unit adapted to calculate an estimated loss value relating to a propagation loss between the second mobile station and the base station apparatus by using the reception quality and the estimated transmission power; and
    a determination unit adapted to determine a radio parameter that affects transmission power of radio communication between the base station apparatus and the first mobile station based on the estimated loss value.

2. The base station apparatus according to claim 1, wherein the calculation unit calculates the estimated loss value based on a difference between an estimated transmission power value that is an estimated value of a transmission power of the uplink signal by the second mobile station and the measured value of the reception quality.

3. The base station apparatus according to claim 2, wherein
the uplink signal is a signal transmitted to the first base station that is different from any of the base station apparatus and the first mobile station,
the transmission power of the uplink signal by the second mobile station is determined according to information based on a downlink signal transmitted from the first base station, and
the calculation unit determines the estimated transmission power value by using the information based on the downlink signal.

4. The base station apparatus according to claim 3, wherein
the information based on the downlink signal is reception quality of the downlink signal,
the base station apparatus further comprises second measurement unit adapted to measure reception quality of the downlink signal, and
the calculation unit determines the estimated transmission power value by using the reception quality of the downlink signal measured by the second measurement unit.

5. The base station apparatus according to claim 4, wherein the estimated transmission power value is a value of transmission power that is exhibited on an assumption that the base station apparatus connects to and communicates with the first base station as a mobile station.

6. The base station apparatus according to claim 3, wherein
the information based on the downlink signal is transmission power increase/decrease information included in the downlink signal,
the base station apparatus further comprises reception unit adapted to receive the downlink signal, and
the calculation unit determines the estimated transmission power value by using the transmission power increase/decrease information extracted from the downlink signal received by the reception unit.

7. The base station apparatus according to claim 1 wherein the determination unit determines the radio parameter such that at least one of the transmission power of the base station apparatus and the transmission power of the first mobile station is increased with increase in the estimated loss value.

8. The base station apparatus according to claim 1, wherein the first measurement unit measures total received power within a frequency range used for transmission of the uplink signal.

9. The base station apparatus according to claim 8, wherein the first measurement unit uses an average value obtained by multiple measurements of the total received power as the measured value of the reception quality.

10. The base station apparatus according to claim 1, wherein the determination unit determines the radio parameter based on the estimated loss value on condition that the measured value of the reception quality obtained by the first measurement unit is greater than a predefined value.

11. The base station apparatus according to claim 1, wherein the first measurement unit measures the reception quality within a frequency range on condition that the first mobile station is not performing signal transmission to the base station apparatus.

12. The base station apparatus according to claim 1, wherein the estimated loss value is an estimated value of the propagation loss or an estimated value of a building penetration loss caused by a building separating the base station apparatus from the second mobile station.

13. The radio station apparatus according to claim 3, wherein
the base station apparatus is a base station forming a small-scale cell,
the first mobile station is a mobile station that communicates with the base station apparatus within the small-scale cell,
the first base station is a base station forming a large-scale cell overlaid over the small-scale cell, and
the second mobile station is a mobile station that communicates with the first base station within the large-scale cell.

14. A radio resource control method used by a base station apparatus that performs radio communication with at least one first mobile station, the radio resource control method comprising:
measuring reception quality of an uplink signal transmitted from at least one second mobile station that is different from said at least one first mobile station at an installation place of the base station apparatus and communicates with a first base station different from the base station apparatus;
measuring a downlink signal transmitted from the first base station;
calculating an estimated transmission power of the base station by using the information of the downlink signal transmitted from the first base station;
calculating an estimated loss value relating to a propagation loss between the second mobile station and the base station apparatus by using the reception quality and the estimated transmission power; and
determining a radio parameter that affects transmission power of radio communication between the base station apparatus and the first mobile station based on the estimated loss value.

15. The radio resource control method according to claim 14, wherein the calculation of the estimated loss value is performed by using a difference between an estimated transmission power value that is an estimated value of a transmission power of the uplink signal by the second mobile station and the measured value of the reception quality.

16. The radio resource control method according to claim 15, wherein
the uplink signal is a signal transmitted to the first base station that is different from any of the base station apparatus and the first mobile station,
the transmission power of the uplink signal by the second mobile station is determined according to information based on the downlink signal transmitted from the first base station, and
in calculating the estimated loss value relating to the propagation loss, the estimated transmission power value is determined by using the information based on the downlink signal.

17. The radio resource control method according to claim 16, wherein
the information based on the downlink signal is reception quality of the downlink signal,
the radio resource control method further comprises measuring reception quality of the downlink signal, and
in calculating the estimated loss value relating to the propagation loss, the estimated transmission power value is determined by using the reception quality of the downlink signal.

18. The radio resource control method according to claim 17, wherein the estimated transmission power value is a value of transmission power that is exhibited on an assumption that the base station apparatus connects to and communicates with the first base station as a mobile station.

19. The radio resource control method according to claim 16, wherein
the information based on the downlink signal is transmission power increase/decrease information included in the downlink signal,
the radio resource control method further comprises receiving the downlink signal, and
in calculating the estimated loss value relating to the propagation loss, the estimated transmission power value is determined by using the transmission power increase/decrease information extracted from the downlink signal received.

20. The radio resource control method according to claim 14, wherein in determining the radio parameter relating to radio communication, the radio parameter is determined such that at least one of the transmission power of the base station apparatus and the transmission power of the first mobile station is increased with increase in the estimated loss value.

21. The radio resource control method according to claim 14, wherein the reception quality measured is total received power within a frequency range used for transmission of the uplink signal.

22. The radio resource control method according to claim 21, wherein in measuring the reception quality of the uplink signal, an average value obtained by multiple measurements of the total received power is used as the measured value of the reception quality.

23. The radio resource control method according to claim 14, wherein in calculating the estimated loss value relating to the propagation loss, the radio parameter based on the estimated loss value is determined on condition that the measured value of the reception quality is greater than a predefined value.

24. The radio resource control method according to claim 14, wherein in measuring the reception quality of the uplink signal, the reception quality within a frequency range is measured on condition that the first mobile station is not performing signal transmission to the base station apparatus.

25. The radio resource control method according to claim 14, wherein the estimated loss value is an estimated value of the propagation loss or an estimated value of a building penetration loss caused by a building separating the base station apparatus from the second mobile station.

26. A non-transitory recording medium storing a radio station control program to cause a computer to execute control processing relating to a base station apparatus that performs radio communication with at least one first mobile station and communicates with a first base station different from the base station apparatus, the control processing comprising:
a process (a) of obtaining a measured value obtained by measuring reception quality of an uplink signal transmitted from at least one second mobile station that is different from said at least one first mobile station at an installation place of the base station apparatus and obtaining a measured value obtained by measuring a downlink signal transmitted from the first base station;
a process (b) of calculating an estimated transmission power of the base station by using the information of the downlink signal transmitted from the first base station and calculating an estimated loss value relating to a propagation loss between the second mobile station and the base station apparatus by using the reception quality and the estimated transmission power; and
a process (c) of determining a radio parameter that affects transmission power of radio communication between the base station apparatus and the first mobile station based on the estimated loss value.

27. The non-transitory recording medium storing a radio station control program according to claim 26, wherein the calculation of the estimated loss value in the process (b) is performed by using a difference between an estimated transmission power value that is an estimated value of a transmission power of the uplink signal by the second mobile station and the measured value of the reception quality.

28. The non-transitory recording medium storing a radio station control program according to claim 27, wherein
the uplink signal is a signal transmitted to the first base station that is different from any of the base station apparatus and the first mobile station,
the transmission power of the uplink signal by the second mobile station is determined according to information based on the downlink signal transmitted from the first base station, and
in the process (b), the estimated transmission power value is determined by using the information based on the downlink signal.

29. The non-transitory recording medium storing a radio station control program according to claim 28, wherein
the information based on the downlink signal is reception quality of the downlink signal,
the control processing further comprises a process (d) of obtaining a measured value of reception quality of the downlink signal, and
in the process (b), the estimated transmission power value is determined by using the reception quality of the downlink signal.

30. The non-transitory recording medium storing a radio station control program according to claim 28, wherein
the information based on the downlink signal is transmission power increase/decrease information included in the downlink signal,
the control processing further comprises a process (d) of obtaining the transmission power increase/decrease information extracted from the downlink signal, and
in the process (b), the estimated transmission power value is determined by using the transmission power increase/decrease information obtained in the process (d).

31. The non-transitory recording medium storing a radio station control program according to claim 26, wherein in the process (c), the radio parameter is determined such that at least one of the transmission power of the base station apparatus and the transmission power of the first mobile station is increased with increase in the estimated loss value.

32. A radio communication system comprising:
a base station that performs radio communication with at least one first mobile station and communicates with a first base station different from the base station apparatus;
a first measurement unit adapted to measure reception quality of an uplink signal transmitted from at least one second mobile station that is different from said at least one first mobile station at an installation place of the base station;
a second measurement unit adapted to measure a downlink signal transmitted from the first base station;
a first calculation unit adapted to calculate an estimated transmission power of the base station by using the information of the downlink signal transmitted from the first base station;

a second calculation unit adapted to calculate an estimated loss value relating to a propagation loss between the second mobile station and the base station by using the reception quality and the estimated transmission power; and a determination unit adapted to determine a radio parameter that affects transmission power of radio communication between the base station and the first mobile station based on the estimated loss value.

33. The radio communication system according to claim 32, wherein at least the first measurement unit, the calculation unit, and the determination unit are disposed within the base station.

* * * * *